United States Patent [19]

Hodgkin

[11] 4,284,512

[45] Aug. 18, 1981

[54] IRON SELECTIVE RESINS PREPARED FROM A PHENOL, HCHO AND A DI-SECONDARY AMINE

[75] Inventor: Jonathan H. Hodgkin, Burwood, Australia

[73] Assignee: Commonwealth Scientific and Industrial Research Organization, Australia

[21] Appl. No.: 100,020

[22] Filed: Dec. 3, 1979

[30] Foreign Application Priority Data

Nov. 29, 1979 [AU] Australia ............................... PE1490

[51] Int. Cl.³ .......................... C02F 1/42; C02F 1/64; C08G 14/06; C08G 14/12
[52] U.S. Cl. .................................... 210/688; 210/698; 210/912; 521/35; 521/37; 521/39; 525/505; 528/158; 528/162; 528/163
[58] Field of Search ........................ 528/158, 162, 163; 521/35, 37, 39; 525/505; 210/688, 698, 912

[56] References Cited

U.S. PATENT DOCUMENTS

| | | | |
|---|---|---|---|
| 2,033,092 | 3/1936 | Bruson | 528/163 |
| 2,036,916 | 4/1936 | Bruson | 528/158 X |
| 2,316,714 | 4/1943 | Reider | 528/162 X |
| 2,636,019 | 4/1953 | Butler et al. | 528/162 X |
| 2,807,594 | 9/1957 | Haagen | 521/39 |
| 2,890,095 | 6/1959 | Meister et al. | 528/163 X |
| 2,997,460 | 8/1961 | De Groote | 528/162 X |
| 3,606,988 | 9/1971 | Walz et al. | 528/162 X |
| 3,878,136 | 4/1975 | Höfel et al. | 528/144 X |
| 3,975,268 | 8/1976 | Broddevall | 521/39 X |
| 4,190,709 | 2/1980 | Hodgkin | 521/39 |

FOREIGN PATENT DOCUMENTS 49-34997 3/1974 Japan .

OTHER PUBLICATIONS

J. Macromol Science–Chem., A10 (1 & 2), pp. 309–337 & 354–365, Ramirez et al.

*Primary Examiner*—Howard E. Schain
*Attorney, Agent, or Firm*—Bacon & Thomas

[57] ABSTRACT

Ferric ions may be removed very selectively from aqueous solutions by means of a metal-chelating resin consisting of the acid-quaternized form of a cross-linked polymer produced by the condensation of a phenolic component comprising one or more phenols, formaldehyde, and a diamino component comprising one or more di-(secondary amino) compounds under neutral conditions. The resin is prepared by treating the cross-linked polymer with an aqueous solution of a strong mineral acid.

14 Claims, No Drawings

IRON SELECTIVE RESINS PREPARED FROM A PHENOL, HCHO AND A DI-SECONDARY AMINE

This invention is concerned with ion-exchange resins which are capable of very selective removal of ferric ions from aqueous solutions of low pH and methods for the synthesis of these resins. These materials have a further advantage that the metal can be recovered easily from the resins under appropriate conditions.

An iron selective resin has particular advantages in many areas of hydrometallurgy and in many electrochemical industries as the ferric ion is a ubiquitous contaminant of metal solutions and it causes many problems in the electrochemical purification of other metals. Important examples occur in the purification of cobalt, nickel and copper.

The use of ion-exchange resins for the removal of metal ions from aqueous solutions is commercially widespread; especially in water-softening applications and for the removal of toxic products from effluents. Other areas of importance are in the processing of radioactive wastes and the purification of rare earth metals. Many of these commercial ion-exchange resins do have some selectivity for certain metal ions but as this is usually only by a factor of 2 or 3 it is not often of economic significance.

In an effort to improve this selectivity a considerable amount of research has been carried out in the area of chelating resins which because of their multifunctional nature have greatly improved metal selectivity for the transition metal ions over the alkali metal ions. Many chelating polymers have been synthesized and are commercially available, e.g. imidoacetic acid resins of the Dowex A-1 and Chelex 100 type ("Dowex" and "Chelex" are registered trade marks). However, most of these resins are only marginally selective for a particular heavy metal ion.

Ion-exchange resins of sufficient selectivity and cheapness have many potentially important applications. These include the removal of polluting heavy metal ions in the effluent from electroplating or metal pickling baths. Another possible application is the recovery of metals from dilute mine dump leachings where selective solvent extraction using low molecular weight chelating agents is being used commercially but problems of solvent and complexing agent loss prevent wider use of solvent extraction (G. Ciggett and W. Hopkins, Chem. & Ind. 23, 1019 (1976)). The possibility of medical use, e.g., for selective removal of poisoning metal ions, could be a welcome benefit of selective resins.

As a result of research carried out on the synthesis of highly selective ion exchange resins, a number of resins with improved selectivity for copper and mercury have been reported. These materials have generally been made by carrying out a series of chemical transformations on crosslinked polystyrene. [I. V. Sarbaskii et. al., U.S.S.R. 507, 588 (1976); L. R. Melby, *J. Amer. Chem. Soc.*, 97, 4044 (1974); R. R. Grinstead et. al., in "Extractive metallurgy of Copper" vol. 2 Yannopolous and Agarwal Eds., 1976, AIME New York pp. 1009–1024] polyethylene-imine, [A. K. Kusaiva et. al., *Izv. Akad. Nauk. Kaz. SSR, Ser. Khim.*, 26 (3), 33 (1976); Tsuchida et. al., *J. Polym. Sci., Polym. Chem. Ed.*, 14, 1557 (1976)] or poly(4-vinyl pyridine), [Hiroyuki et al., *Makromol Chem.*, 177, 2295 (1976)]. Any reaction carried out on a preformed polymer leads to the formation of some non selective or nonabsorbing defect structures on the chain, which cannot then be removed. Multiple reactions compound the formation of defects considerably and hence limit the selectivity of a resin. The costs of such chemical transformations also limit greatly the applicability of the chelating resins formed.

Another type of chelating polymer has been made by direct synthesis, using the condensation of phenol, formaldehyde and iminodiacetic acid [Japan, Kokai, 75, 92, 991 (1975) and 75, 107, 092 (1975)]. Also the condensation of polyamines, formaldehyde and 8-hydroxyquinoline [V. Balakin and V. V. Glukahikk, Iz. *Vyssh. Uchebn. Zaved, Khim, Kihm, Tekhnol*, 18 (9), 1466-9 (1975); F. Vernon, *Chemistry and Industry*, 634 (1977)] gives a similar chelating polymer. However, in both these cases (and in most other attempts to form chelating polymers) well-known, strong chelating structural units are used in the polymers. These powerful chelating units have precluded the development of high selectivity. Another common type of phenol/formaldehyde resin is that formed with various mono- or di-primary amines especially under acid catalysed conditions [e.g. A. Rio U.S. Pat. No. 3,976,571]. In these cases many different reactions can and do occur at the one amine group. Because of this these resins do not have high metal selectivity.

Our copending Australian Patent application No. 3629/78 and U.S. patent application Ser. No. 908,820, now U.S. Pat. No. 4,190,709, issued Feb. 26, 1980 (filed May 23, 1978) describe resins which are highly selective for copper and mercury.

These resins are polymers produced by the condensation of a phenolic component comprising one or more phenols, formaldehyde, and a diamino component comprising one or more di-(secondary amino) compounds, under neutral (Mannich reaction) conditions. The preferred polymers are formed from diamino compounds in which the secondary amino groups are present as part of a saturated heterocyclic ring, the most preferred polymers being those prepared using piperazine which have the following structure:

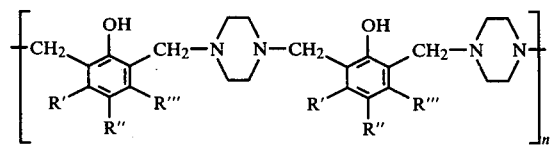

where R' and R''' are independently lower (C$_1$–C$_3$) alkyl groups or hydrogen atoms and R'' is a hydrogen atom or a crosslinking group.

We have now found that, surprisingly, the abovedescribed resins will, when chemically modified, selectively absorb ferric ions and no longer absorb copper or any other metal ions (except a small amount of mercury). The chemical modification involved is quaternization by aqueous acids.

Thus, in accordance with the present invention there is provided a metal-chelating resin, selective for ferric ions and consisting of the acid-quaternized form of a cross-linked polymer produced by the condensation of a phenolic component (comprising one or more phenols) formaldehyde, and a diamino component (comprising one or more di(secondary amino) compounds) under neutral conditions.

The preferred polymers, and their methods of preparation are described in our aforesaid copending applications, the disclosure of which is incorporated herein by reference.

The preferred method of quaternization is by treatment of the polymer with an aqueous solution of a strong mineral acid. The preferred acid is sulphuric acid at about 2 N concentration but other acids such as nitric and hydrochloric can be used.

When the quaternized resins of this invention adsorb ferric ion they form deep purple complexes which are stable at pH below 7 provided a stronger complexing agent is not present in the solution in sufficient concentration.

The invention also includes a method for the selective removal of ferric ions from an aqueous solution which comprises contacting the solution with a quaternized resin as described above.

Strong ferric complexing agents can be used to remove the ferric ion from the quaternized resin for resin reuse. Examples of such complex-forming agents include the chloride ion at low pH, i.e. 2 N hydrochloric acid, or phosphoric acid. Once the resin has been stripped by the solution it can then be prepared for readsorption of iron by washing with distilled water or more preferably (to build up higher capacity) dilute sulphuric acid and then distilled water. At any stage of the process the original copper-adsorbing form of resin can be recovered by neutralizing the quaternary form with strong base solutions such as ammonia or sodium hydroxide.

The treatment of ferric ion solutions can be carried out at any pH where ferric ions are stable in solution without other strong complexing agents being added. The presence of many other metal ions such as copper, nickel, zinc, cadmium and cobalt do not affect the resins capacity for iron. In use, the resins may be contained in any of the equipment now used for treatment of water by ion exchange resins.

The invention is further described and elucidated in the following examples. These should not be construed, however, as limiting the invention in any way.

EXAMPLE 1

This example illustrates the general method of preparation of a ferric ion-selective chelating resin from any of the previously described resins specific for copper and mercury (i.e. as described in our aforesaid copending application).

The free base resin (100 g, smaller than 10 mesh particles) was stirred with 1 liter of 2 N sulphuric acid solution for 20 mins. and then the solid product filtered off and washed with two 1 liter lots of distilled water to give the resin in the quaternized form.

EXAMPLE 2

The selectivity of an ion-exchange resin prepared in Example 1 is demonstrated as follows.

The starting resin was prepared in accordance with Example 1 of our aforesaid copending application which is reproduced here for ease of reference.

Phenol (42.3 g, 0.45 mole) and bisphenol A (11.4 g, 0.05 mole) were dissolved in ethanol (1½ liter) and piperazine hexahydrate (108 g, 0.55 mole) was added slowly with stirring. After complete addition the mixture was cooled in an ice bath and stirred while formaldehyde solution (37% formaldehyd; 100 ml, 1.2 mole) was added slowly. The mixture was then heated slowly to increase the temperature over 2 hours to a vigorous reflux with strong stirring. Some solid product started to form after about 3 hours heating but after 12 hours a further (0.3 mole) of formaldehyde solution was added slowly and the reflux was continued a further 12 hours. The solution was decanted off and the solid product washed with ethanol and then water. The resin was then soaked in 0.1 N hydrochloric acid for 24 hours which caused it to break up into small flexible particles. The resin particles were washed with 0.1 N hydrochloric acid until the washings remained transparent after basification with ammonia. This removed soluble organic material. The resin was then washed with distilled water, ammonia and distilled water again to give the free base product.

This resin was then quaternized using the general method of Example 1 above and a 1 g portion of the wet resin particles were equilibrated by stirring in 100 ml samples of sodium sulphate/sulphuric acid solutions of pH 1–4 containing 100 ppm each of ferric, cupric, zinc, cobalt, nickel and cadmium salts. The concentrations of the various ions were monitored by atomic absorption spectroscopy. No significant (>1 ppm) quantities of ion uptake over 24 hours was noticed for the zinc, cobalt, nickel and cadmium salts. A slight (≃2–4 ppm) uptake of copper ions was noticed at the higher pH's but almost none at pH 1 to 2. The ferric ion uptake was almost complete above pH 2 (i.e. less than 2 ppm remaining unchelated by the dark purple resin), at pH 1 85% was taken up. Treatment of the resin with 2 N hydrochloric acid completely removed the ferric ion from the resin.

EXAMPLE 3

Column operation, demonstrating the selectivity of the quaternized resin of Example 2 was carried out as follows:

Approximately 20 g of the quaternized resin particles were packed as a slurry in a glass column. A solution containing 100 ppm of copper, nickel, cobalt and ferric sulphates in 0.1 N sodium sulphate at pH 2.5 was passed through the column and the effluent monitored by atomic adsorption spectroscopy. The copper, nickel and cobalt ions start to emerge in the 1st bed volume of eluent and the latter two ions were emerging at full concentration by the 3rd bed volume. The copper concentration did not reach full concentration till the 10th bed volume and ferric ion did not emerge until the 50th bed volume.

For removal of the ferric ion from the dark purple resin column without any other contaminating ion the column was first washed with 0.1 N sulphuric acid (2 bed volumes; to remove impurity ions) and then 2 bed volumes of 2 N hydrochloric acid solution. The latter extracted the ferric ion as the pure hydrochloride complex.

I claim:

1. A metal-chelating resin, selective for ferric ions and consisting of the acid-quaternized form of cross-linked polymer produced by the condensation of a phenolic component comprising one or more phenols, formaldehyde, and a diamino component consisting essentially of one or more di(secondary amino) compounds under neutral conditions.

2. A resin as claimed in claim 1, quaternized with a strong mineral acid.

3. A resin as claimed in claim 2, wherein the acid is sulphuric acid.

4. A resin as claimed in claim 1, wherein the diamino component comprises one or more di-(secondary amino) compounds in which each secondary amino group forms part of a saturated heterocyclic ring.

5. A resin as claimed in claim 4, wherein amino component is piperazine or 4,4'-bipiperidine.

6. A resin as claimed in claim 1, wherein the phenolic component comprises one or more compounds selected from the group consisting of hydroxybenzene and hydroxybenzenes having $C_1$ to $C_3$ alkyl substituents in the 3 and/or 3 and 5 positions.

7. A resin as claimed in claim 6, wherein the phenolic component is selected from the group consisting of hydroxybenzene and 3-ethyl-1-hydroxybenzene.

8. A resin as claimed in claim 1, wherein the phenolic component includes a bisphenol, bisphenol sulphide or bisphenol sulphoxide as a crosslinking agent.

9. A resin as claimed in claim 1, wherein the diamino component is piperazine and the polymer has the structure

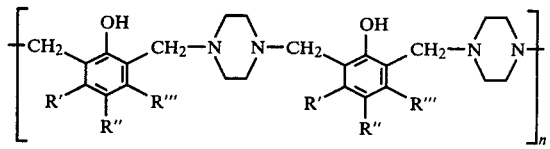

where R' and R''' are independently lower ($C_1$-$C_3$) alkyl groups or hydrogen atoms and R'' is a hydrogen atom or a crosslinking group.

10. A method for preparing an iron-selective metal-chelating resin which comprises treating a cross-linked polymer, with an aqueous solution of a strong mineral acid, said polymer having been prepared by condensing approximately equimolar quantities of a phenolic component comprising one or more phenols, and a diamino component consisting essentially of one or more di-(secondary amino) compounds with approximately twice the molar quantity of formaldehyde under Mannich reaction conditions.

11. A method as claimed in claim 10, wherein the aqueous acid is sulphuric acid of about 2 N concentration.

12. A method for the selective removal of ferric ions from an aqueous solution which comprises contacting the solution with a resin as claimed in claim 1.

13. A method as claimed in claim 12, wherein the iron-loaded resin is subsequently treated with a complexing agent to remove the iron.

14. A method as claimed in claim 13, wherein the complexing agent is hydrochloric acid.

* * * * *